United States Patent [19]

Gruber

[11] Patent Number: 5,472,165
[45] Date of Patent: Dec. 5, 1995

[54] SEAT ADJUSTER WITH COMPENSATING LINK

[75] Inventor: Rudolf Gruber, Markham, Canada

[73] Assignee: Multimatic Inc., Unionville, Canada

[21] Appl. No.: 354,881

[22] Filed: Dec. 9, 1994

Related U.S. Application Data

[63] Continuation of Ser. No. 906,329, Jun. 30, 1992, abandoned.

[51] Int. Cl.$^6$ ........................................................ B60N 2/04
[52] U.S. Cl. ........................................ 248/424; 297/344.1
[58] Field of Search .................................. 248/424, 393, 248/394, 396, 419, 420, 421, 429; 297/344.1, 344.2, 344.11–344.19, 344.21–344.26

[56] References Cited

U.S. PATENT DOCUMENTS

| | | | |
|---|---|---|---|
| 2,902,211 | 10/1959 | Kaller | 248/419 |
| 2,920,684 | 1/1960 | Fante et al. | 248/394 X |
| 2,921,621 | 1/1960 | Williams et al. | 248/394 |
| 2,942,647 | 6/1960 | Pickles | 248/394 |
| 2,980,163 | 4/1961 | Pickles | 248/419 X |
| 3,006,594 | 10/1961 | Gruendler | 248/419 X |
| 3,008,681 | 11/1961 | Matthews | 248/424 X |
| 3,022,035 | 2/1962 | Pickles | |
| 3,037,735 | 6/1962 | Matthews | 248/394 |
| 3,136,524 | 6/1964 | Pickles | 248/424 |
| 3,137,472 | 6/1964 | Louton, Jr. et al. | 248/420 X |
| 3,149,815 | 9/1964 | Cotter | 248/421 |
| 4,010,927 | 3/1977 | Pickles | 248/429 X |
| 4,121,802 | 10/1978 | Kluting et al. | 248/421 |
| 4,778,139 | 10/1988 | Babbs | 297/344.17 X |
| 4,807,932 | 2/1989 | Hong | 297/346 |
| 4,948,081 | 8/1990 | Hatta | 248/396 |
| 5,154,402 | 10/1992 | Hill et al. | 297/344.14 X |
| 5,199,679 | 4/1993 | Nakamura et al. | 248/421 X |

FOREIGN PATENT DOCUMENTS

| | | |
|---|---|---|
| 2855293 | 7/1980 | European Pat. Off. . |
| 4010451 | 10/1991 | European Pat. Off. . |
| 3643729A1 | 7/1988 | Germany . |
| 1082004 | 9/1967 | United Kingdom ................ 297/344 |
| WO91/04881 | 4/1991 | WIPO . |

Primary Examiner—Rinaldi I. Rada
Assistant Examiner—Clark F. Dexter
Attorney, Agent, or Firm—Neil H. Hughes; Ivor M. Hughes

[57] ABSTRACT

A seat adjuster comprising a system of linkages utilizing the effect of a compensating primary link which compensates for the normally uncompensated arcuate motion of the primary links. The links are attached to the riser, or the seat bottom and cooperate with each other in motion through the compensating link which is attached to the riser if the links are attached to the seat bottom and vice versa. The motion of the compensating link combines with the motion of the primary links to provide a substantially linear fore and aft motion to the seat.

10 Claims, 8 Drawing Sheets

CHART OF DIMENSIONS

SEAT ADJUSTER WITH COMPENSATING LINK

This is a continuation of application Ser. No. 07/906,329 filed on Jun. 30, 1992, which is now abandoned.

FIELD OF INVENTION

This invention relates to mechanisms for moving a seat bracket and the seat attached forward and backwards in relation to a frame. Specifically this invention finds application in seats for a vehicle.

BACKGROUND OF THE INVENTION

A multitude of devices are known in the prior art for moving vehicle seats fore and aft in relation to a frame of a vehicle. Most of the assemblies found in the prior art relate to seat tracks upon which the seat bracket and the seat attached thereto are releasably moveable. However these assemblies are heavy in construction and add to the weight of the vehicle unnecessarily.

Further there exists a number of devices for the movement of a seat which generally do not rely on rails to provide the fore and aft movement of the seat but provide pivotable members attached to the seat bracket to move the seat in relation to the frame. Examples of such assemblies are described below.

U.S. Pat. No. 4,807,932 issued on Feb. 28, 1989 to Kia Motors describes a device for moving an automobile seat back and forth including legs pivotable to the frame which move the seat along an arcuate path.

U.S. Pat. No. 4,121,802 issued on Oct. 24, 1978 to Keiper KG describes a device as illustrated in relation to FIG. 2 including a linkage operative for vertical movement of the carrier in relation to a base.

PCT Application WO 91/04881 published on Apr. 18, 1991 describes the parallel motion between a seat and a support frame which includes a system of links.

West German Patent Application 4,010,451 published on Oct. 2, 1991 and Assigned to Audi describes the longitudinal motion of a seat by means of a four bar linkage system. The motion of the seat is clearly arcuate as seen in the figures.

Finally, West German Patent Application 2,855,293 published on Jul. 3, 1980 to Fichtel & Sachs AG describes a multi-link adjustment member for a seat which purports to provide generally linear motion of the seat.

Nowhere within the prior art is there found a preferably compact adjustment mechanism for a seat which includes a linkage system including a compensating link to compensate for the arcuate motion of the primary links of the mechanism rendering the final longitudinal motion of the seat as substantially linear within the range of motion of the seat.

It is therefore an object of this invention to provide a seat adjustment mechanism which includes a linkage system moveable within the limits of motion of the seat to a predetermined number of positions wherein the linkage system includes a compensating link to compensate for the arcuate motion of the primary links of the mechanism, during the fore and aft movement of the seat, rendering the final longitudinal motion of the seat as substantially linear within the range of motion of the seat. It is particularly advantageous to provide a compact design to minimize the space required for the installation of the assembly.

It is another object of this invention to provide a mechanism which operates silently and requires little lubrication.

It is a further object of the invention to provide a seat adjuster which is lightweight compact and economical to manufacture.

Further and other objects of this invention will become apparent to a man skilled in the art when considering the following summary of the invention and the more detailed description of the preferred embodiment illustrated herein.

SUMMARY OF THE INVENTION

To these ends according to a primary aspect of the invention there is provided a seat adjuster for longitudinal fore and aft adjustment of a seat in relation to a stationary frame comprising a linkage system for providing the longitudinal movement of the seat including at least two links for moving the seat fore and aft and at least one compensating means such as a link for compensating for the substantially arcuate motion of the at least two links of the linkage system of the seat, the cooperative motion of the at least one compensating means such as a link rendering the movement of the linkage system and the seat as substantially linear within the range of movement of the seat. For example the at least two links in use move in an arcuate upward and forward motion during the forward motion of the seat, and in an arcuate downward and rearward motion during the rearward movement of the seat. To compensate for this arcuate motion, which would alter the head room of an occupant if uncompensated for as the seat is moved within its range of longitudinal motion, the compensating link moves in an upward and forward compensating arcuate motion during the forward movement of the seat and in a downward and rearward compensating arcuate motion during the rearward movement of the seat thereby compensating for the motion of the at least two links and rendering the motion of the seat in relation to the stationary frame by maintaining the seat in a substantially constant parallel position with respect to the frame throughout the range of movement of said seat so that there is no appreciable arcuate movement but a substantially linear movement of said seat in relation to the frame.

According to another aspect of the invention there is provided a seat adjustment mechanism for the longitudinal motion of a seat bracket, having the seat disposed therewith in use, in relation to a stationary frame member of a vehicle, the seat adjuster mechanism comprising a linkage system moveable, for example pivotable, within the limits of motion of the seat to and from a predetermined number of positions, the linkage system including at least two primary links which provide as they move with respect to the frame the longitudinal motion of the seat bracket in relation to the frame, and a compensating link to compensate for the substantially arcuate motion of the at least two primary links of the mechanism during the fore and aft movement of the seat, rendering the final longitudinal motion of the seat as substantially linear within the range of motion of the seat.

According to yet another aspect of the invention there is provide a system for providing linear movement of a vehicle seat comprising a seat bracket, having a seat disposed therewith in use, and a riser, each of the seat bracket and the riser having a front and rear, top and bottom; the seat bracket being located substantially on top of said riser in use; at least two first links pivotally engaged with said seat bracket, one of said at least two first links being connected proximate the front of the seat bracket and the other of said at least two first links being connected proximate the rear of said seat bracket; at least two second longer links, being longer than said first links, and pivotally engaged with said seat bracket, one of said at least two second links being pivotally connected proximate the front of said seat bracket but offset towards the rear and towards the top of the seat bracket in relation to the pivot of the first link, and the other of said at least two second links being pivotally connected proximate the rear of said seat bracket but offset towards the rear and towards the top of the seat bracket in relation to the pivot of the first link, said at least two first and second links being pivotally interconnected with at least two compensating third links pivotably connected with the front and rear of the riser, the at least two first links being interconnected with the at least two compensating third links proximate the free end of the at least two third compensating links respectively, the at least two second links being interconnected with the at least two compensating third links intermediate the free ends of the at least two compensating third links and pivoting the end of the at least two compensating third links connected with the riser respectively, the at least two first and second links providing the longitudinal fore and aft motion of seat bracket in relation to the riser, the at least two compensating third links compensating for the arcuate motion of the at least two first and second links maintaining the seat bracket in a substantially constant parallel position with respect to the riser throughout the range of movement of said seat bracket so that there is no appreciable arcuate movement but a substantially linear movement of said seat bracket in relation to the riser.

For example the at least two first and second links in use move in an arcuate upward and forward motion during the forward motion of the seat, and in an arcuate downward and rearward motion during the rearward movement of the seat. To compensate for this arcuate motion, which would alter the head room of an occupant if uncompensated for as the seat is moved within its range of longitudinal motion, the at least two compensating third links move in an upward and forward compensating arcuate motion during the forward movement of the seat and in a downward and rearward compensating arcuate motion during the rearward movement of the seat thereby compensating for the motion of the at least two first and second links and rendering the motion of the seat bracket in relation to the frame by maintaining the seat bracket in a substantially constant parallel position with respect to the riser throughout the range of movement of said seat bracket so that there is no appreciable arcuate movement but a substantially linear movement of said seat bracket in relation to the riser.

In a preferred embodiment of the invention of any of the above mentioned embodiments the riser may further comprise integral detent portions (for example cutouts or windows) disposed proximate the top thereof to fasten the seat bracket in relation to the riser at various detent positions in relation thereto, the seat bracket including latching means (for example a resiliently biased moveable pawl) which releasably engages the latching portions of the riser as the seat is moved to and from alternative comfort positions. Preferably the seat bracket and or the riser may further comprise portions disposed proximate the bottom of the seat bracket and or the top of the riser which portions engage with one another to provide resistance to lateral forces tending to move the bracket laterally in relation to the riser and assist in guiding the bracket longitudinally in relation to the riser. In a preferred embodiment the portions are downwardly extending flanges of the seat bracket which surround the top of the riser and further assist in guiding the longitudinal motion of the seat bracket in relation to the riser, preferably the latching means when in a latched position extends through an openings in the riser and through aligned opening extending through the seat bracket.

In another preferred embodiment the riser may further comprise integral latching portions proximate the bottom thereof to fasten the riser, the seat bracket and the seat in use to floor latching portions (for example strikers recessed in the floor of the vehicle).

Those skilled in the art will appreciate that many modifications can be made to the seat adjuster described herein. Any system of linkages used as a seat adjuster utilizing the effect of a compensating member or the like which compensates for the arcuate motion of the system if left uncompensated would fall within the scope of this invention.

BRIEF DESCRIPTION OF THE DRAWINGS

The invention will now be illustrated with respect to the following drawings illustrating embodiments of the invention in which.

DETAILED DESCRIPTION OF PREFERRED EMBODIMENTS OF THE INVENTION

Figure 1:
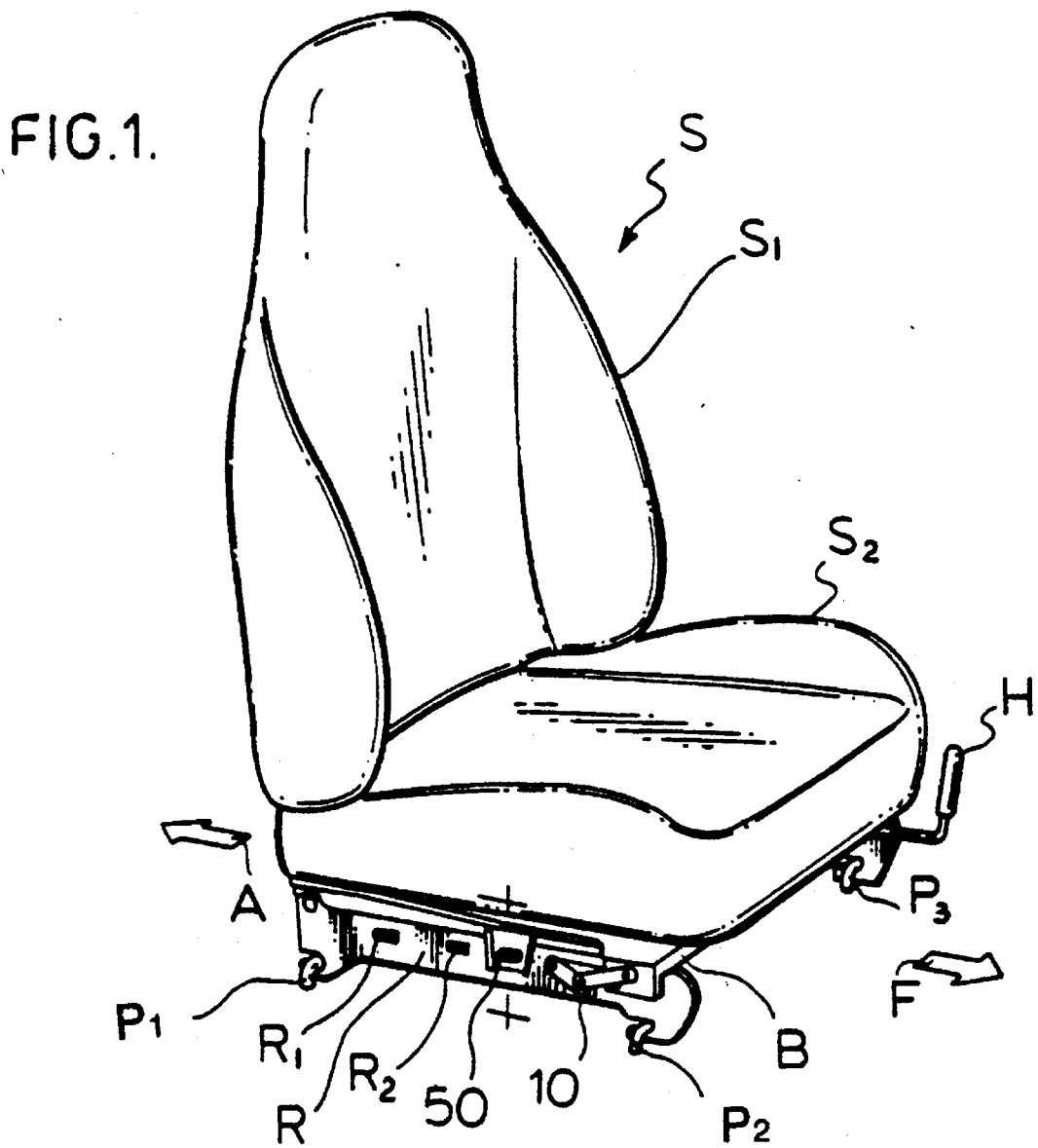
FIG. 1 is a perspective view of a preferred embodiment of the invention installed upon a vehicle.

Referring now to FIG. 1, there is illustrated in perspective view a vehicle seat S including a seat back S1 and a seat S2. The seat S2 is attached to a seat bracket B which is pivotably engaged with a riser R anchored to the floor of a vehicle. As is the convention with removeable seats for a truck or van, pins P1 and P2 are provided for the latching, via latch mechanisms L1 and L2, of the riser R and therefore the seat S2 to the vehicle. The pins or strikers P1 and P2 are often recessed within openings or wells provided in the floor of a vehicle such as a van. A similar riser with pin and latch connections is provided on the other side of the seat.

A seat adjuster 10 is provided at the front and rear and on both sides of the seat S2, to provide the longitudinal fore and aft motion of the seat S2 in relation to the stationary riser R in the directions F and A respectively. A resiliently biased latching mechanism 50, operative via handle H, in cooperation with openings B1 of the seat bracket and R1, R2 and R3 provided with the riser allow for the motion of the seat to and from these predefined comfort positions.

Figure 2:
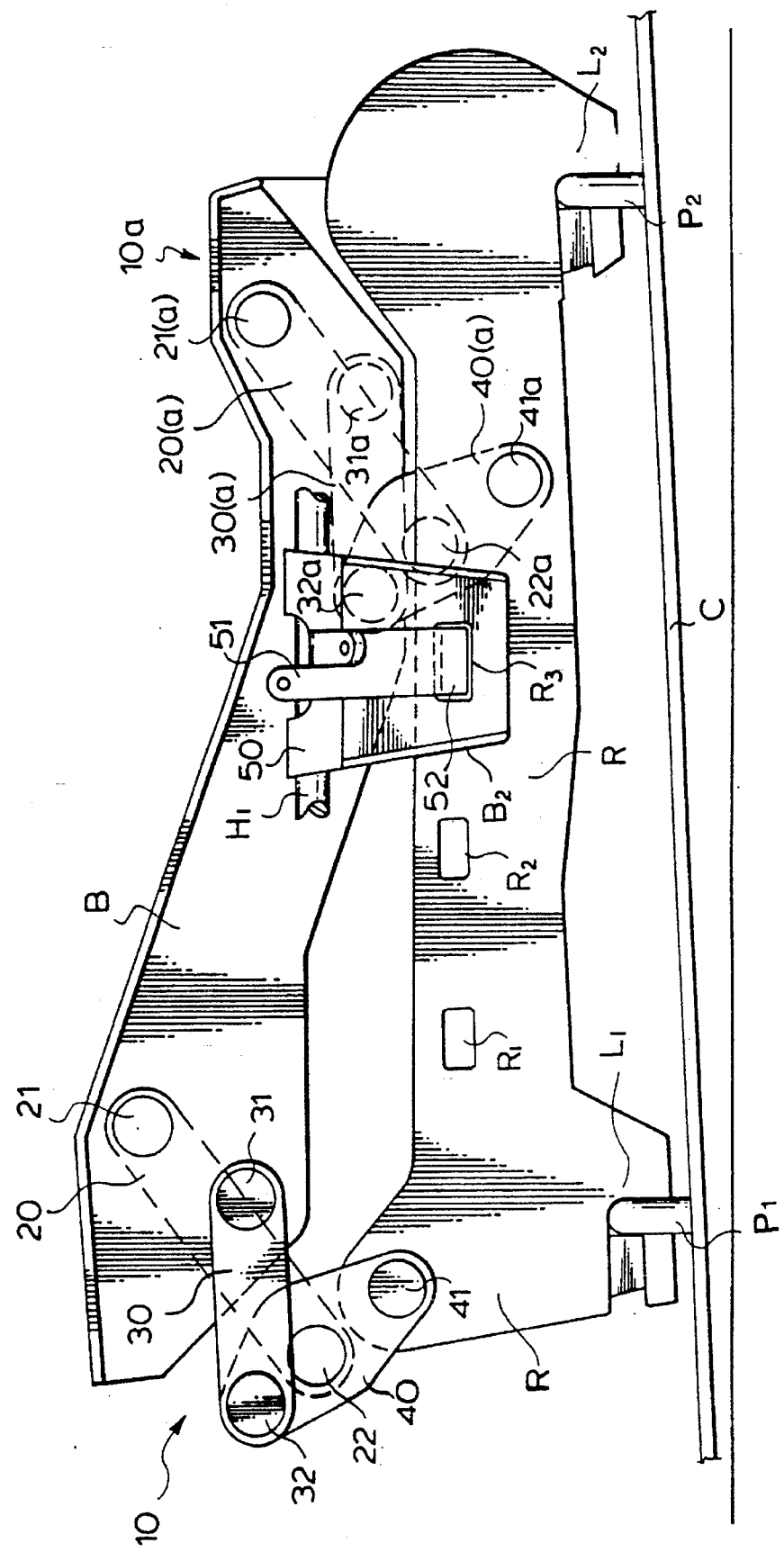
FIG. 2 is a side plan view of the seat adjuster of FIG. 1 illustrated in a preferred embodiment of the invention.
Figure 3:
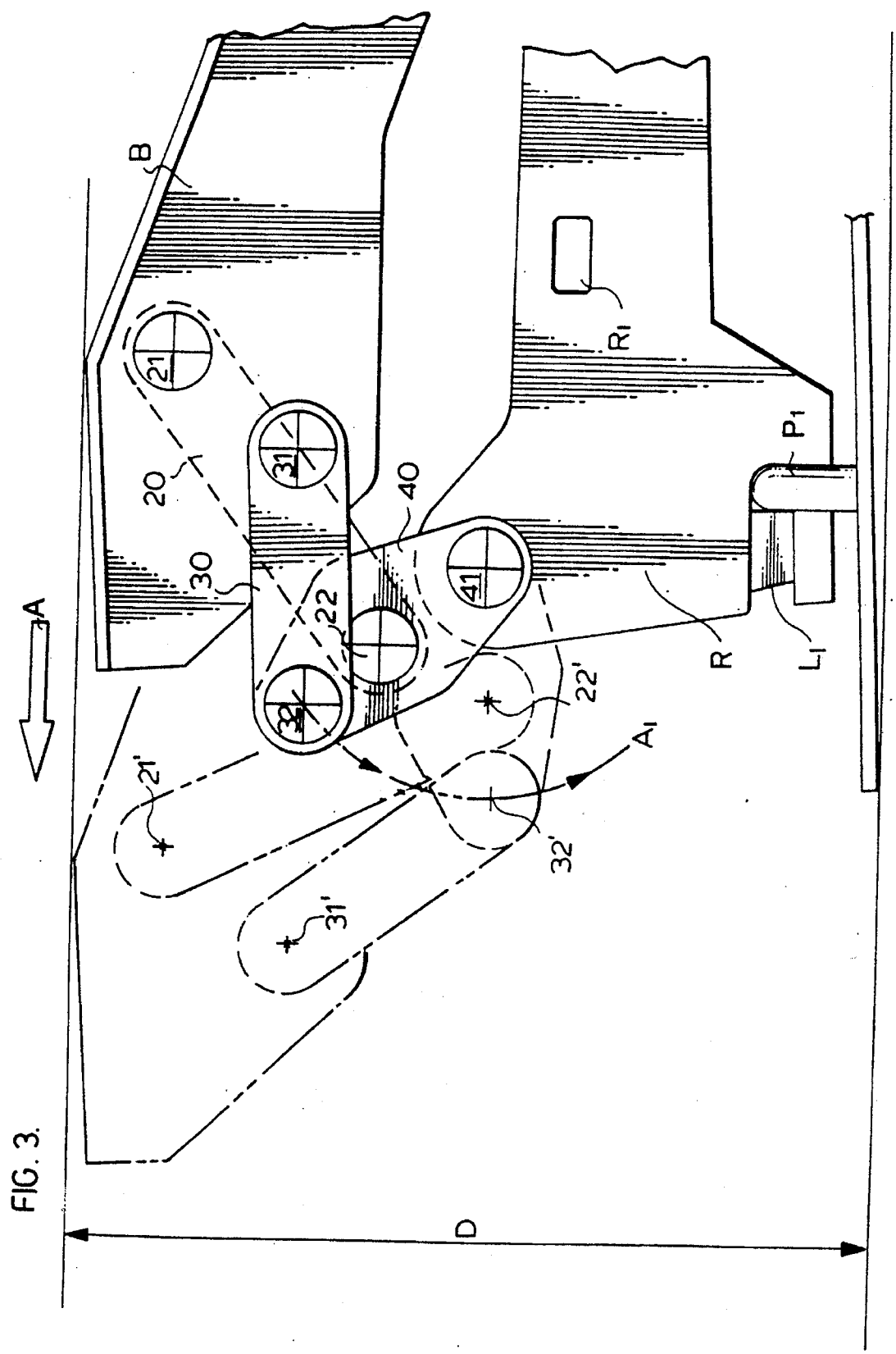
FIG. 3 is a schematic view of the rear end of the seat adjuster of FIG. 2 illustrated in a preferred embodiment of the invention.
Figure 4:
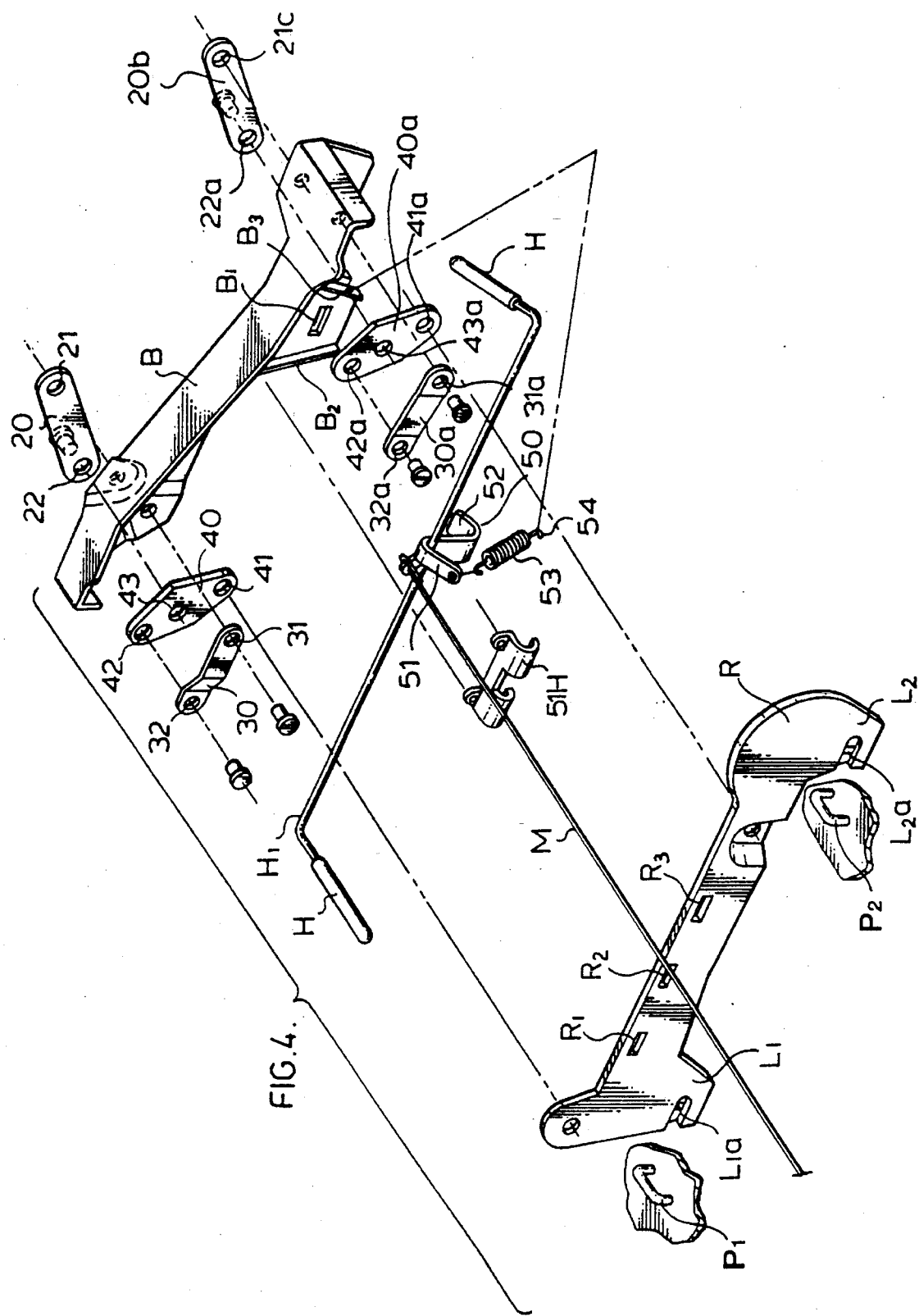
FIG. 4 is an exploded perspective view of the mechanism of FIG. 2 illustrated in a preferred embodiment of the invention.
Figure 5:
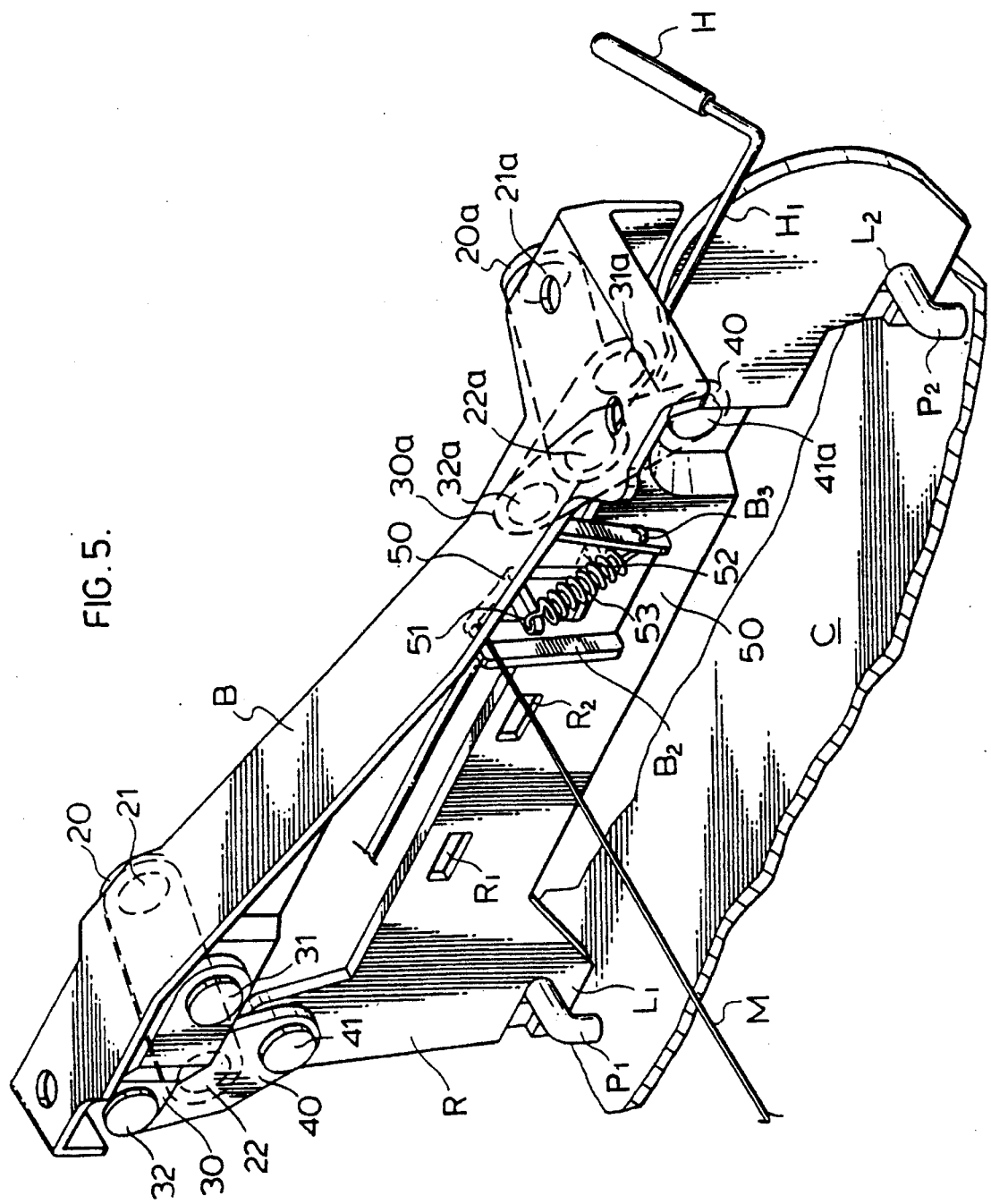
FIG. 5 is a perspective view of the mechanism of FIG. 2 and illustrated in a preferred embodiment of the invention.

Referring now to FIGS. 2 and 3, illustrated in side plan view, FIG. 4, illustrated in exploded perspective view and FIG. 5, illustrated in perspective, the mechanisms 10 and 10a disposed proximate the front and rear of the seat bracket B provide for the substantially linear movement thereof with respect to the riser R via the cooperative pivotal operation of the links 20, 30, and 40, and 20a, 30a, and 40a. The links 40 and 40a pivot from the riser R at pivots 41 and 41a. The links 20 and 20a pivot from the seat bracket B at 21 and 21a respectively and from proximate the center 22 and 22a of link 40 and 40a. The links 30 and 30a pivot from the seat bracket B at 31 and 31 a respectively and from proximate the free ends 32 and 32a of link 40 and 40a.

Figure 6:
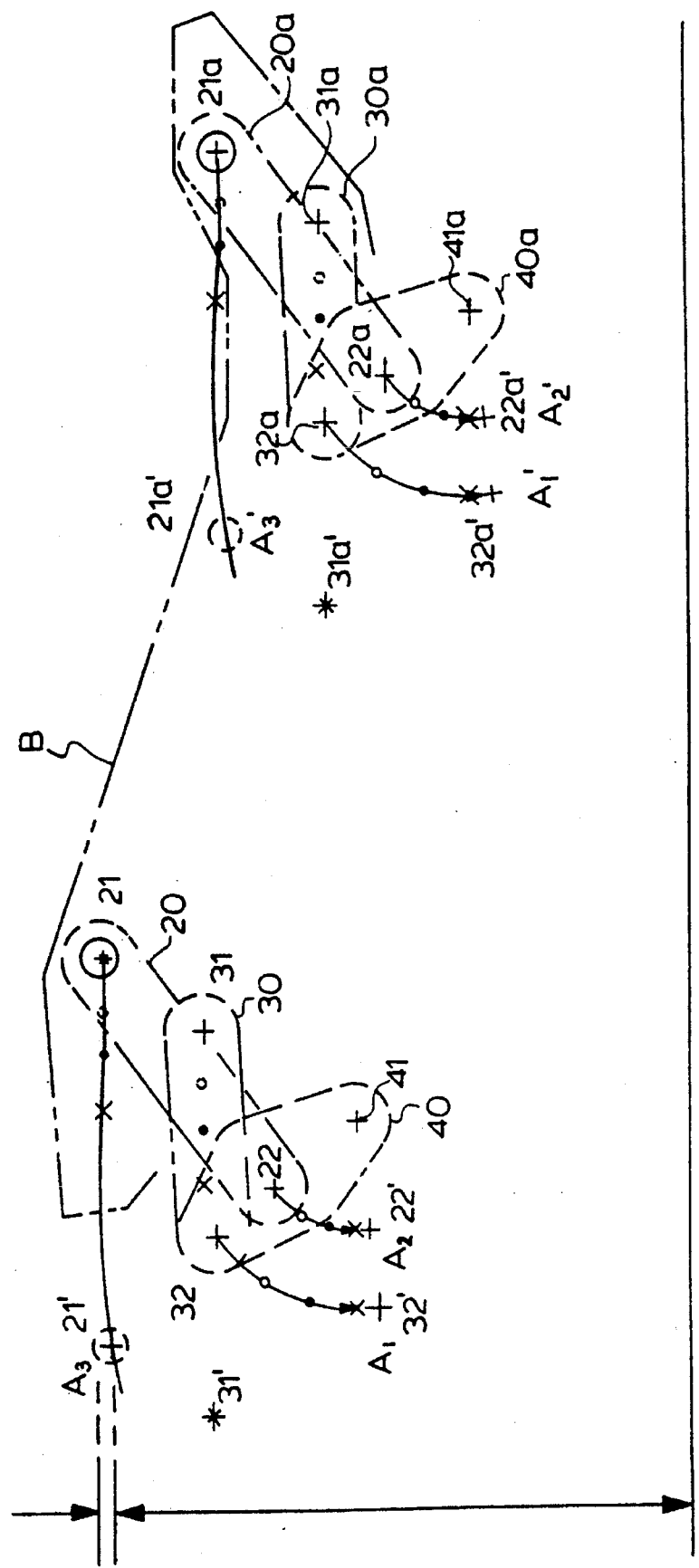
FIG. 6 is a schematic view of the operative positions of the seat of FIG. 1 illustrated in a preferred embodiment of the invention.
Figure 7:
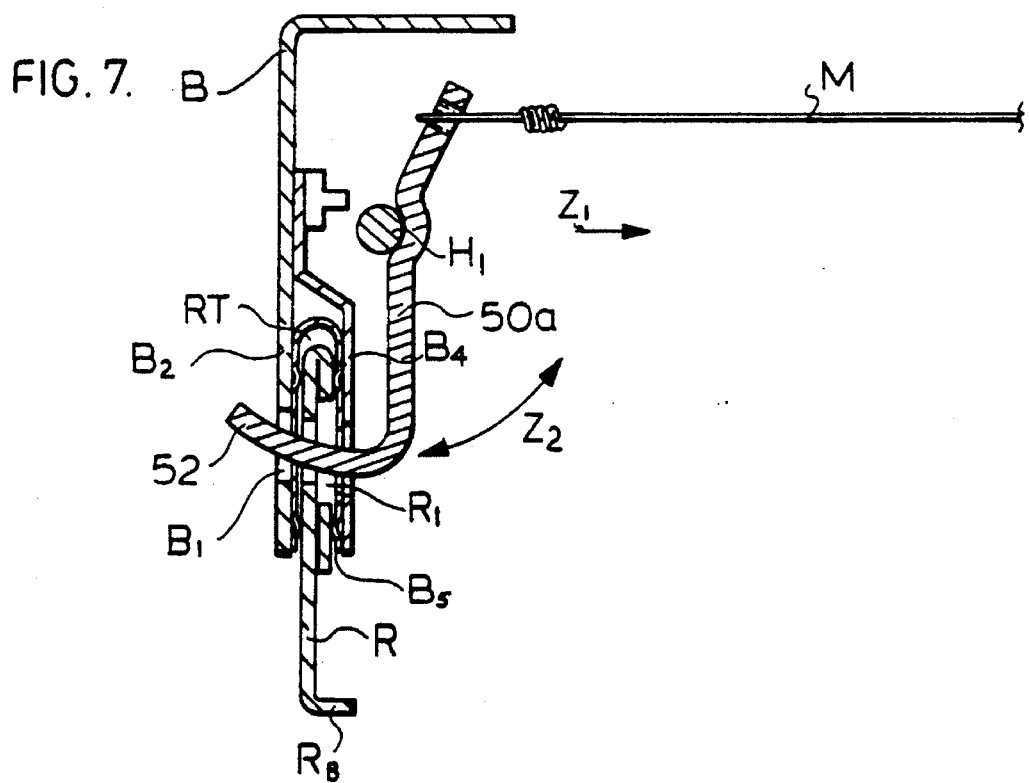
FIG. 7 is a front plan view on one side of the seat of the latching mechanism 50 of FIG. 2 illustrated in a preferred embodiment of the invention.

The seat bracket and riser may be formed by conventional stamping techniques or the like, wherein the necessary features such as the mounting opening for seat S2, the latch positions R1, R2 and R3, the slotted latch portions L1 and L2, and the openings for the pivots are provided. The supplementary portion B4 (as best seen in FIG. 7) of seat bracket B may be affixed with B by conventional methods such as welding, fastening or the like. The latch 50 is resiliently biased via spring 53 and operative via the handle H causing portion H1 of the handle extension to engage near end 51 of the latch 50 and thereby move the detent 52 out of openings B1, and R3 as illustrated and therefore allow motion of the seat in the forward direction F by the operator. As at this Juncture the seat bracket B is free to move as urged by an occupant in relation to the stationary riser R, the pairs of links 20, 20a, 30, 30a and 40, 40a will pivot over described cooperative paths, as best seen in FIG. 6 which result in the movement of the seat S2 in relation to the floor C of FIG. 2 in a substantially linear path. In empirically optimizing the seat adjuster it has been determined that by tracking the movement of the ends of the top links 20 and 30 and providing the shape of compensating link 40 that the seat adjuster 10 will maintain the seat bracket B a substantially constant distance within the range of 2.65 mm during the fore and aft movement of the seat. This minimum variation is a direct result of the selection of the dimensions of the links. The largest range provided during the evaluation was 6.38 min. The set of readings illustrated in FIG. 8 represent the optimum dimensions to-date.

Figure 8:
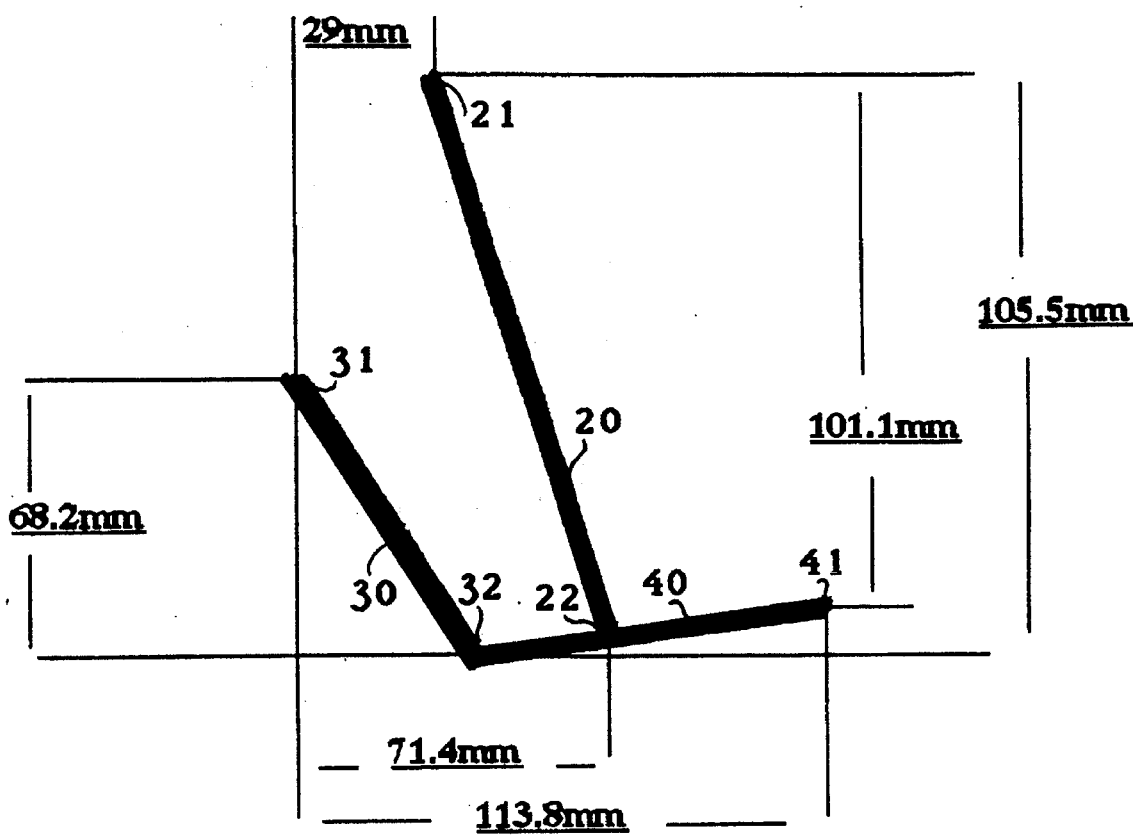
FIG. 8 is a schematic illustration of the link system.

The charted relationships of FIG. 8 result in the minimum 2.65 mm variation of the seat over its range of movement. The links 20, 30, and 40 are schematically illustrated to depict the distances between their pivots and their free ends. The exact dimensions therefore can be extrapolated by simple trigonometry. The amount of variation allowed therefore depends on the amount of headroom available to the occupant.

The resultant seat adjuster 10 has been found to be considerably lighter (34.2%) than conventional systems and thereby maximizes the strength to weight ratio. Further the links 20 and 30 may be ribbed along their lengths to improve the strength thereof. Link 40 is illustrated as wider than 20 or 30 since it carries the total loading of the system. The center cross section has been increased as it requires more strength at this juncture than over the rest of its length.

Referring now to FIGS. 3 and 6 there is schematically illustrated the compensating effect that compensating link 40 has on the movement of the overall seat adjuster 10. For example the top ends 21 and 31 of the two links 20 and 30 in use would move in an arcuate upward and forward motion during the forward motion of the seat S2, and in an arcuate downward and rearward motion during the rearward movement of the seat S2. To compensate for this arcuate motion, which would alter the head room of an occupant if uncompensated for as the seat S2 is moved within its range of longitudinal motion, the two compensating links 40 and 40a move in an upward and forward compensating arcuate motion during the forward movement of the seat S2 and in a downward and rearward compensating arcuate motion during the rearward movement of the seat S2 thereby compensating for the motion of the two links 20 and 30 and rendering the motion of the seat bracket B in relation to the riser R by maintaining the seat bracket B in a substantially constant parallel position with respect to the riser R throughout the range of movement of said seat bracket B so that there is no appreciable arcuate movement thereof but a substantially linear movement of said seat bracket B in relation to the riser R. As can be observed in relation to FIGS. 3 and 6 ends 22 and 22a of links 20 and 20a move along the arcuate paths A2 and A2' as the compensating links 40 and 40a pivot upon their pivots 41 and 41a attached with the riser R. Similarly ends 32 and 32a of links 30 and 30a move along the arcuate paths A1 and A1' as the compensating links 40 and 40a pivot upon their pivots 41 and 41a attached with the riser R. The resultant effect upon the ends 21, 21a and 31 and 31a is a compensation of their known arcuate movements resulting in them adopting the positions 21', 21a', 31' and 31a' which are disposed a maximum of 2.65 mm from a perfect horizontal line extending through points 21, 21a, 31, and 31a respectively. Therefore the motion of the seat S2 attached to the seat bracket B in relation to the stationary riser R may be said to be substantially linear within the range of motion of the seat.

Referring now to FIGS. 2, 4, and 7, (illustrated in close-up front plan view) the assembly for the latch 50 which is fixed with the bracket B via portion 51H as illustrated. The pawl is resiliently biased by spring 53 fixed at end 54 with the bracket portion B3. Movement therefore of the handle H and hence portion H1 moves the pawl 50a laterally away from the openings B1 and R1 allowing end 52 to clear the openings and allow unencumbered movement of the seat bracket B in relation to the riser R. As can be seen in FIG. 7, seat bracket B includes portions B2 and B4 which surround the top of the riser RT which assists in the lateral and longitudinal tracking of the seat bracket B in relation to the riser R and minimizes any play in the seat adjuster. Also it is recommended that the compensating link be pivoted from the riser rather than reversing the assembly as illustrated since pivoting the compensating link from the seat bracket and the other two links from the riser results in more play introduced into the system which must be compensated for.

Those skilled in the art will appreciate that many modifications can be made to the seat adjuster described herein. Any system of linkages used as a seat adjuster utilizing the aspect of a compensating member which compensates for the arcuate motion of the system if left uncompensated would fall within the scope of this invention.

As many changes can be made to the preferred embodiments of the invention without departing from the scope of the invention; it is intended that all material contained herein be interpreted as illustrative of the invention and not in a limiting sense.

The embodiments of the invention in which an exclusive property or privilege is claimed are as follows:

1. A seat adjuster for longitudinal fore and aft adjustment of a seat bracket in relation to a stationary riser to establish a range of movement of a seat disposed on the seat bracket, the seat adjuster comprising a linkage system for providing the longitudinal fore and aft adjustment of the seat bracket including at least two links, each link having two ends and having disposed proximate each end a pivot opening, the at least two links both being connected either to the stationary riser or to the seat bracket proximate one of said ends thereof and having substantially arcuate motion for moving the seat bracket fore and aft, the linkage system of the seat adjuster futher including at least one compensating link for compensating for the substantially arcuate motion of the at least two links of the linkage system of the seat adjuster, the compensating link having three pivot openings and connecting to the opposite of the seat riser or seat bracket with respect to said at least two links at one pivot opening and being connected to both of the at least two links at the remaining pivot openings, the motion of the at least one compensating link combining with the substantially arcuate motion of the at least two links to provide substantially linear motion of the seat bracket within the range of movement of the seat.

2. The seat adjuster of claim 1 wherein the at least two links move in an arcuate upward and forward motion during the fore adjustment of the seat bracket, and in an arcuate downward and rearward motion during the aft adjust of the seat bracket wherein such arcuate upward and forward motion and arcuate downward rearward motion would alter head room of an occupant if uncompensated for as the seat is moved, the compensating link moving in an upward and forward compensating arcuate motion during the fore adjustment of the seat bracket and in a downward and rearward compensating arcuate motion during the aft adjustment of the seat bracket thereby compensating for the motion of the at least two links and maintaining the seat bracket in a substantially constant parallel position with respect to the riser throughout the range of movement of said seat.

3. A seat adjustment mechanism for longitudinal motion of a seat bracket, having a seat disposed therewith in use, in relation to a stationary riser of a vehicle, the seat adjuster mechanism comprising a linkage system moveable to establish limits of motion of the seat to and from a predetermined number of positions, the linkage system including at least two primary links each having two ends and having disposed proximate each end a pivot opening, the at least two links both being connected either to the stationary riser or to the seat bracket proximate one of said ends thereof and having substantially arcuate motion, wherein the at least two links provide as they move with respect to the stationary riser the longitudinal motion of the seat bracket in relation to the stationary riser, the linkage system further including a compensating link to compensate for the substantially arcuate motion of the at least two primary links of the mechanism during the movement of the seat to and from said predetermined number of positions, the compensating link having at least three pivot openings and connecting to the opposite of the stationary riser or the seat bracket with respect to said at least two links at one pivot opening and being connected to both of the at least two links at the remaining pivot openings rendering a final longitudinal motion of the seat as substantially linear within the limits of motion of the seat.

4. A system for providing linear movement of a vehicle seat to alternate comfort positions comprising a seat bracket having a seat disposed therewith in use, the seat bracket being moveably affixed to a riser, each of the seat bracket and the riser having a front and rear, top and bottom; the seat bracket being located substantially on top of said riser in use; at least two first links pivotally engaged with said seat bracket, one of said at least two first links being connected proximate the front of the seat bracket and the other of said at least two first links being connected proximate the rear of said seat bracket; at least two second longer links, being longer than said first links, and pivotally engaged with said seat bracket, one of said at least two second links being pivotally connected proximate the front of said seat bracket, the pivot connection of said one of said second links and said seat bracket being offset towards the front and towards the top of the seat bracket in relation to the pivot connection of the first link and said seat bracket, and the other of said at least two second links being pivotally connected proximate the rear of said seat bracket, the pivot connection of said other of said second links and said seat bracket being offset towards the front and towards the top of the seat bracket in relation to the pivot connection of the first link and said seat bracket, said at least two first and two second links each respectively being pivotally interconnected with at least two compensating third links pivotably connected proximate the front and rear of the riser and having a free end remote from the riser and a pivoting end proximate the riser, the at least two first links each being interconnected with a respective one of the at least two compensating third links proximate the free end of the at least two compensating third links respectively, the at least two second links each being interconnected with a respective one of the at least two compensating third links respectively intermediate the free end and the pivoting end of each of the at least two compensating third links, the at least two first and two second links providing longitudinal fore and aft motion of the seat bracket in relation to the riser, the at least two compensating third links compensating for arcuate motion of the at least two first and two second links maintaining the movement of the seat bracket along an axis which is substantially parallel with respect to the riser throughout the movement of said seat bracket.

5. The system of claim 4 wherein top ends of the at least two first and two second links which are connected to said seat bracket move in an arcuate upward and forward motion during forward motion of the seat, and in an arcuate downward and rearward motion during rearward movement of the seat; said two compensating third links each providing a compensating motion to compensate for this arcuate motion and to prevent altering head room of an occupant as the seat is moved, the free end of the at least two compensating third links moving in an upward and forward compensating arcuate motion during forward movement of the seat and in a downward and rearward compensating arcuate motion during rearward movement of the seat thereby compensating for the motion of the at least two first and second links and maintaining the motion of the seat bracket in relation to the frame in a substantially constant parallel position with respect to the riser throughout movement of said seat bracket.

6. The system of claims 4 or 5 wherein the riser further comprises integral detent portions disposed proximate the top thereof to fasten the seat bracket in relation to the riser at various detent positions in relation thereto, the seat bracket including latching means which releasably engage the detent portions of the riser as the seat is moved to and from alternative comfort positions.

7. The system of claim 6 further comprising portions disposed proximate the bottom of the seat bracket and the top of the riser which engage with one another and provide resistance to lateral forces tending to move the bracket laterally in relation to the riser, said portions assisting in longitudinally guiding the bracket in relation to the riser.

8. The system of claim 7 wherein the portions are downwardly extending flanges of the seat bracket which surround the top of the riser and further assist in longitudinally guiding the seat bracket in relation to the riser.

9. The system of claim 8 wherein the latching means when latched simultaneously extend through one of said detent portions in the riser and through an aligned opening extending through the seat bracket.

10. The system of claims 4 or 5 wherein the riser further comprises integral latching portions proximate the bottom thereof to fasten the riser to floor latching portions.

* * * * *